United States Patent Office 3,121,012
Patented Feb. 11, 1964

3,121,012
LIGHT SENSITIVE TRIPHENYLMETHANE
LEUCOCYANIDE COMPOSITIONS
Meyer S. Agruss, Chicago, Ill., assignor to Miehle-Goss-Dexter, Incorporated, Chicago, Ill., a corporation of Delaware
No Drawing. Filed Feb. 8, 1960, Ser. No. 7,081
13 Claims. (Cl. 96—90)

This invention relates to the art of printing and is particularly concerned with the preparation of new and useful photosensitive compositions which may be coated on paper or other suitable surfaces, in the form of essentially colorless or relatively lightly colored bodies, and which are rendered colored, or deeply colored, by exposure, through a desired transparency or the like, to electromagnetic radiation lower than 4000 angstrom units, particularly ultraviolet light or other such activating rays, for instance, X-rays.

It has long been known that solutions of aminotriarylacetonitriles or, in other words, leucocyanides of triphenylmethane dyes, generally in the form of solutions thereof, may be coated on paper or other materials in conjunction with an activator and exposed to ultraviolet light or shorter wave lengths, through a transparency, whereupon said aminotriarylacetonitriles are converted into colored bodies or dyes. Suitable activators known for such purpose are, for instance, alcohols, phenols, carboxylic acids such as tartaric acid, citric acid and benzoic acid, as well as other carboxylic acids and esters thereof, veratrole, resorcinol dimethyl ether, ethylene glycol ethers, phosphoric acid esters of monohydroxy compounds, aromatic carbinols, and numbers of other compounds. These approaches, and others, are disclosed in various patents among which may be mentioned U.S. Patents Nos. 2,441,561; 2,528,496; 2,676,887; 2,829,052; and 2,844,465. Thus, as disclosed in said patents, if an organic solvent solution, for example, a toluene solution, of a leucocyanide of a triphenylmethane dye, for instance, pararosaniline leucocyanide, malachite green leucocyanide, tetrachloro malachite green leucocyanide, crystal violet leucocyanide, and various other leucocyanides of triphenylmethane dyes such as are shown in the aforementioned patents, is coated onto paper, such solution is not affected by ultraviolet light. However, when an activator, for example, a higher molecular weight alcohol or higher molecular weight amine, or other activators, such as the activators disclosed in the aforementioned patents, is present, the leucocyanides of the triphenylmethane dyes become extremely sensitive to ultraviolet light and the leucocyanide compounds are changed quite quickly to their colored dye compounds.

In practical use, the compositions of the prior art, such as those which have been discussed above, have numbers of serious objections. For instance, when paper is coated with a solution of a leucocyanide of a triphenylmethane dye together with activators of the type described above, and said coated papers are exposed to ultraviolet light through a transparency, the colored dye images which result tend to fade out and become substantially colorless in a relatively short period of time, sometimes of the order of 24 hours, and this not infrequently occurs in the dark as well as under ambient light conditions. By "ambient" light conditions is meant normal indoor lighting or daylight. Attempts have been made to meet this problem, generally, for example, by the addition of acids, particularly non-violatile organic acids such as stearic acid, and, in certain special instances, by the selection of specific types of leucocyanides. Although the addition of such carboxylic acids as stearic acid tends to prevent the disappearance of the image while stored in the dark, under ambient light storage conditions the background of the image continues to get darker with the passage of time.

It has been discovered, in accordance with the present invention, that if certain substances, hereafter described, are incorporated into photosensitive compositions of the type which comprise a leucocyanide of a triphenylmethane dye and an activator therefor, and the resulting composition is coated on paper or other surfaces and exposed to ultraviolet rays or the like activating rays through a transparency or the like, the development of the colored dye is enhanced, and background darkening under ambient light conditions is very substantially reduced or inhibited.

The foregoing results are achieved through the utilization, in combination in the foregoing environment, of chemical compounds, which, when subjected to ultraviolet light or other activating rays as hereafter pointed out, undergo change in chemical composition, the changed chemical compounds possessing an acidic reaction. Among the chemical compounds which have the above-described property or characteristic, those which have been found to be particularly satisfactory are certain halogen-containing compounds and certain boron-containing compounds.

Illustrative examples of said halogen-containing compounds are phenylphosphorodichloridate, chloromethylphosphorodichloridate, dibutylphosphorochloridate, and dioctylphosphorochloridate, and the corresponding bromine and iodine derivatives. This class of compounds can be represented by the formula $$(hal_n\text{—}R\text{—}O)_mPO\text{—}hal_x$$

where R is an aliphatic or aromatic radical, particularly a hydrocarbon radical, hal is chlorine, bromine or iodine, $x$ is an integer from 1 to 2, $n$ is zero or 1, and $m$ is 1 when $x$ is 2 and $m$ is 2 when $x$ is 1. R may be, by way of example, alkylene such as methylene, ethylene, propylene, isopropylene, or butylene; alkyl such as methyl, ethyl, propyl, isopropyl, butyl, isobutyl, hexyl, octyl, iso-octyl, decyl or dodecyl; or phenyl, benzyl, tolyl, cresyl, naphthyl, and isopropyl naphthyl.

Illustrative examples of said boron-containing compounds are trimethoxyboroxine, triethoxyboroxine, and tripropoxyboroxine. These compounds may be represented by the formula

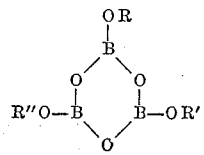

where R, R' and R" are alkyl radicals, particularly lower alkyl radicals such as methyl, ethyl, propyl, isopropyl, butyl and isobutyl.

Another compound, not falling into either of the two foregoing subgroups, and which is likewise useful in the practice of my invention, is orthonitrobenzaldehyde. This compound, too, under the influence of ultraviolet light, is converted to a different compound which possesses an acidic reaction.

The foregoing chemical compounds, it will be seen, are in themselves ineffective to bring about coloration of the triphenylmethane dye but, under the influence of electromagnetic radiation lower than 4000 angstrom units, they are converted to different chemical compounds having a greater acidity and sufficient to enhance the development of coloration of the triphenylmethane dye.

The aforesaid chemical compounds which, under the influence of electromagnetic radiation of less than 4000 angstroms, and particularly ultraviolet light, are converted to different chemical compounds having an acidic reaction, can be utilized, as stated above in conjunction or in mixture or in combination with leucocyanides of triphenylmethane dyes and activators therefor. The leucocyanide-activator compositions may, for instance, be those such as have heretofore been known in the art, as illustrated by the heretofore identified patents. They may also comprise such compositions containing leucocyanides of triphenylmethane dyes and activators therefor, as well as certain additional ingredients, all as is described in my copending application, Serial No. 4,875, filed January 27, 1960.

In my aforesaid copending application, I have disclosed, among other things, the utilization as activators for said leucocyanides of triphenylmethane dyes of certain titanium esters which also possess the property of reducing or preventing background darkening under ambient light conditions. These titanium esters, as there disclosed, are derived from hydroxy alkylene, and especially from tetrahydroxyalkylene, derivatives of alkylene polyamines, particularly ethylene diamine, at least most of the alkylene diamine derivatives, whose titanium esters are employed, being represented by the formula

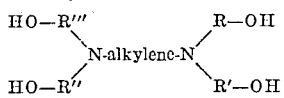

where alkylene is ethylene, propylene or butylene, and R, R', R'' and R''' are each lower alkylene radicals as, for instance, ethylene, propylene, isopropylene, butylene and isobutylene. Also disclosed are titanium esters derived from corresponding derivatives prepared from alkylene triamines and tetra-amines as, for instance, diethylenetriamine and triethylene tetra-amine. Illustrative examples of such compounds, in the form of their titanium esters, disclosed in said copending application, are $N_1N_1N^1N^1$-tetrakis (hydroxyethyl) ethylene diamine; $N_1N_1N^1N^1$-tetrakis (2-hydroxypropyl) ethylene diamine; and $N_1N_1N^1N^1$-tetrakis (2-hydroxybutyl) ethylene diamine, of particular utility being $N_1N_1N^1N^1$-tetrakis (2-hydroxypropyl) ethylene diamine (sold in commerce under the trade name "Quadrol"), there being preferably from 3 to 4 molecules of "Quadrol" for each molecule of titanium in said titanium esters; and tetrakis (2-hydroxypropyl) ethylene diamine isopropyl titanate. Such titanium esters function excellently as activators in compositions made pursuant to the present invention.

In my aforesaid copending application, there is also disclosed the utilization, either in the photosensitive compositions containing leucocyanides of triphenylmethane dyes and activators therefor, or in a separate transparent organic film-forming material top coat which transmits the sensitizing ultraviolet or like rays, of mononuclear aryl esters of hydroxy benzoic acid and certain substituted benzophenones which are effective markedly to reduce the darkening of the background of the exposed coated papers under ambient conditions of light. Here, again, such esters and substituted benzophenones can be incorporated, if desired, into the compositions of the present invention. Illustrative examples of said esters and substituted benzophenones are phenyl meta-hydroxybenzoate; phenyl para-hydroxybenzoate; tolyl meta-hydroxybenzoate; para-cresyl meta-hydroxybenzoate; n-butyl phenyl hydroxybenzoate; tertiary butyl phenyl hydroxybenzoate; and particularly aromatic, especially mononuclear aryl, esters of salicylic acid such as phenyl salicylate, benzyl salicylate, menthyl salicylate, tolyl salicylate, ortho-isopropyl salicylate, ortho-cresyl salicylate, and 4'-tertiary butyl phenyl salicylate; 2,4-dihydroxy benzophenone; 2-hydroxy-4-methoxy benzophenone; 2,2'-4,4'-tetrahydroxy benzophenone; 2,2'-dihydroxy-4,4'-dimethoxy benzophenone; 2,4-dibenzoyl resorcinol; 5-chloro-2-hydroxy benzophenone; and 2,2'-dihydroxy-4-methoxy benzophenone.

It is desirable, in the practice of the present invention, to incorporate the leucocyanide of the triphenylmethane dye, the activator or activators therefor, and the chemical compound which, under the influence of the electromagnetic radiation lower than 4000 angstroms, is converted to a different compound which possesses an acidic reaction, into a solution in a volatile or low boiling organic solvent of a transparent organic film-forming material and coat the paper or other surface therewith, and then evaporate the solvent. The transparent organic film-forming material which can be utilized for this purpose may be selected from among the many synthetic plastics and resins which, per se, are known in the art as, for example, polystyrene, polyesters, polymethacrylates, ethyl cellulose, methyl cellulose, polyvinyl chloride, polyvinyl acetate, regenerated cellulose, nitrocellulose, ethylene glycol terephthalate ("Mylar"), cellulose acetate and chlorinated rubber-like materials. Such film-forming materials, however, when used on conventional sized papers, generally tend to some extent to react with the usual paper sizes with some adverse resulting effects. Among other effects, the formed dyes not infrequently react with such paper sizes. It is, therefore, desirable, as described in my aforesaid copending application, to utilize cellulose acetate butyrates, particularly those having a butyryl content of from 17 to 48 weight percent and an acetyl content of 29.5 to 6 weight percent. Such film-forming materials can be used as barrier film coatings as well as vehicles in which the aforesaid compositions may be embodied and then coated either directly upon the paper or other surface or upon a barrier film coating after the latter has been dried. As disclosed in my said copending application, the cellulose acetate butyrates possess the advantage of not reacting adversely with the usual paper sizes. The transparent organic film-forming materials should advantageously be either unplasticized or very low in their content of plasticizing agents since at least most plasticizers adversely affect the images.

The leucocyanides of the triphenylmethane dyes which are utilized in accordance with the present invention can be selected, for instance, from those which are known to the art and disclosed in numerous patents and publications of which the foregoing patents are typical. These include, in addition to those previously mentioned, and those disclosed in said foregoing patents, leucocyanide of rosaniline; leucocyanide of new fuchsine; 4,4'-bis-dimethylamino-2''-chloro-triphenylacetonitrile and like leucocyanide compounds represented by the formula

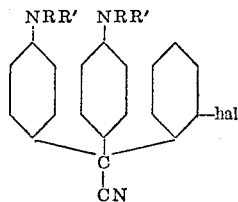

where R and R' are lower alkyl radicals and hal is halogen such as chlorine or bromine.

Various organic solvents can be utilized for the leucocyanides of the triphenylmethane dyes. Low boiling or volatile alcohols, ketones, ethers, esters, and hydrocarbons are available. Typical examples of organic solvents are methyl alcohol, ethyl alcohol, isopropyl alcohol, acetone, dioxane, methylethyl ketone, ethyl ether, isopropyl ether, ethyl acetate, nitromethane, nitroethane, benzene, toluene, dimethylformamide and tetrahydrofurane.

The proportions of the ingredients are variable within reasonable limits.

The leucocyanides of the triphenylmethane dyes will generally be utilized in proportions of the order of 0.25% to 3%, preferably from about 0.5 to 1.5%, by weight of the solution in which they are incorporated and which is utilized for effecting coating of the paper or equivalent surface.

The transparent organic film-forming material will, in general, constitute from about 5% to 10% by weight of the coating solution. It should not be present in such concentrations as to produce solutions of such high viscosity as to render difficult the coating operation. Similar considerations are applicable where said material is used, for instance, simply as a top coating over the leucocyanide-activator coated paper or the like or as a barrier coating directly on the paper over which the leucocyanide coating is applied. The solutions will advantageously have viscosities in the range of 30 to 6000 centipoises at 25 degrees C.

The activators will generally be utilized in proportions of the order of 2 to 25%, preferably about 5 to 12%, by weight of the solution in which the same are incorporated.

The chemical compounds which, under the influence of electromagnetic radiation lower than 4000 angstroms, are converted to different chemical compounds which possess an acidic reaction will generally be used in proportions of the order of 0.1 to 15%, preferably about 0.5 to 5%, by weight of the solution in which the same are incorporated. In the case of the halogen-containing compounds exemplified by the aforementioned chloridate derivatives, the same will ordinarily be used in proportions in the range of 0.1 to 10%, advantageously 0.5 to 5%, by weight of the solution in which the same are incorporated. In the case of the boron-containing compounds exemplified by the trialkylboroxines, the same will ordinarily be used in proportions of 0.5 to 15%, advantageously 1 to 5%, by weight of the solution in which the same are incorporated. The proportions of the orthonitrobenzaldehyde will ordinarily be in the range of 0.5 to 10%, advantageously 1 to 5%, by weight of the solution in which the same is incorporated.

The mononuclear esters of hydroxy benzoic acid and the substituted benzophenones, if utilized, are employed in proportions, as disclosed in my aforesaid copending application, usually in the range of about 0.5 to about 2%, by weight, preferably about 1%, of the coating solution. When embodied in a separate cover coating or top coating, the proportions utilized may be of the same general order.

The following examples are illustrative of compositions falling within the scope of the invention. They are, of course, not to be construed as in any way limitative of the invention since numerous changes may be made, with respect to selection of leucocyanides, activators, coatings, ranges of proportions, and the like, without departing from the novel principles and teachings presented herein. All parts listed are by weight percent.

*Example 1*

| | |
|---|---|
| Leucocyanide of crystal violet | 0.31 |
| Tetrakis (2-hydroxypropyl) ethylene diamine-isopropyl titanate | 4.47 |
| Trimethoxyboroxine (50.2% $B_2O_3$) | 4.47 |
| 20% solution of cellulose acetate butyrate in 50–50 mixture of toluene and ethyl acetate | 26.83 |
| Dioxane | 63.92 |

*Example 2*

| | |
|---|---|
| Leucocyanide of malachite green | 1 |
| Titanium ester of $N_1N_1N^1N^1$-tetrakis (2-hydroxypropyl) ethylene diamine | 15 |
| 25% solution of cellulose acetate butyrate in 50–50 mixture of toluene and ethyl acetates | 30 |
| Trimethoxyboroxine | 5 |
| Dioxane | 49 |

*Example 3*

| | |
|---|---|
| Leucocyanide of pararosaniline | 1 |
| Tetraethylene glycol dimethyl ether | 12 |
| Phenylphosphorodichloridate | 2 |
| 2,4-dibenzoyl resorcinol | 1 |
| 25% solution of cellulose acetate butyrate in 50–50 mixture of toluene and ethyl acetates | 30 |
| Dioxane | 54 |

*Example 4*

| | |
|---|---|
| Leucocyanide of crystal violet | 1 |
| Resorcinol dimethyl ether | 30 |
| 2,2'-4,4'-tetrahydroxy benzophenone | 0.5 |
| Orthonitrobenzaldehyde | 2 |
| 25% solution of cellulose acetate butyrate in 50–50 mixture of toluene and ethyl acetates | 30 |
| Dioxane | 36.5 |

*Example 5*

| | |
|---|---|
| Leucocyanide of malachite green | 1 |
| Titanium ester of $N_1N_1N^1N^1$-tetrakis (2-hydroxypropyl) ethylene diamine | 5 |
| Chloromethylphosphorodichloridate | 3 |
| 25% solution of cellulose acetate butyrate in 50–50 mixture of toluene and ethyl acetates | 30 |
| Dioxane | 61 |

Each of the foregoing compositions is coated onto paper on which advantageously a thin barrier coating comprising a toluene-ethyl acetate solution of cellulose acetate butyrate is first deposited and then dried. After the coatings are dried, they are exposed to a source of ultraviolet light through a cellulose acetate butyrate, cellulose acetate or other transparency. The resulting colored papers show good reproductions which are stable over long periods of time to conditions of darkness as well as ambient light.

Instead of utilizing a single coating of a given thickness containing the leucocyanides of triphenylmethane dyes, it is usually more desirable to employ a plurality of coatings, either two or more, each of thinner character so as to provide a total thickness corresponding to what would otherwise be in the form of a single coating.

The leucocyanides of the triphenylmethane dyes, in the presence of an activator, are, as stated above, sensitive when subjected to ultraviolet light and various of them are also sensitive to other electromagnetic radiation shorter than 4000 angstrom units. Moreover, within the ultraviolet range or the aforesaid range of electromagnetic radiation, the various leucocyanides vary in the sensitivity with different wave lengths. In general, the range of wave lengths in which sensitivity mainly occurs is approximately 2000 to 4000 angstrom units, with strongest sensitivity usually lying in the range of 2500 to 3400 angstrom units. Various suitable sources of the aforesaid rays or radiation are available in the art including, by way of example, quartz mercury lamps, ultraviolet cored carbon arcs, and high-flash lamps.

Transparencies of various types can be employed as, for instance, those of cellulose acetate and cellulose acetate butyrate, advantageously of a thickness not appreciably exceeding 0.0025 inch. When ultraviolet rays are passed through an ordinary film negative, the time required to cause formation of the dye from its leucocyanide is much longer than when no transparency is used. Hence, in order to obtain rapid activation of the leucocyanide, the use of transparencies of the character indicated above is especially advantageous.

While, at least for most purposes, papers will constitute the surfaces on which the photosensitive coatings are deposited, it will be understood that, in the broader aspects of the invention, various other materials can be used such as metals, glass, textile fabrics, and sheet stock or films of synthetic plastics such as cellulose acetate, cellophane, cellulose acetate butyrate, etc.

The photosensitive compositions of the present invention may have incorporated therein various supplemental agents such as have heretofore been utilized in known photosensitive compositions so long as they do not adversely affect the desired properties and characteristics of said compositions.

The invention is of value in the arts of color and multi-color printing, photography and photoduplication, microfilm enlargement, and actinometry.

What is claimed and desired to be secured by Letters Patent is:

1. A photosensitive composition, sensitive to electromagnetic radiation lower than 4000 angstrom units, comprising a leucocyanide of a triphenylmethane dye, an activator therefor, and a chemical compound which is ineffective to bring about coloration of the triphenylmethane dye but which, under the influence of said electromagnetic radiation, is converted to a different chemical compound having a greater acidity and sufficient to enhance the development of coloration of said triphenylmethane dye.

2. A photosensitive composition, sensitive to electromagnetic radiation lower than 4000 angstrom units, comprising an organic solvent solution containing an organic film-forming material, a leucocyanide of a triphenylmethane dye, an activator for said leucocyanide, and a chemical compound which is ineffective to bring about coloration of the triphenylmethane dye but which, under the influence of said electromagnetic radiation, is converted to a different chemical compound having a greater acidity and sufficient to enhance the development of coloration of said triphenylmethane dye.

3. A photosensitive composition, sensitive to ultraviolet light, comprising a leucocyanide of a triphenylmethane dye, an activator therefor, and trimethoxyboroxine.

4. A photosensitive composition in accordance with claim 3, in which the stated ingredients are dissolved in an organic solvent solution of cellulose acetate butyrate.

5. A photosensitive composition in accordance with claim 1, in which said chemical compound is a halogen-containing compound corresponding to the formula $$(hal_n-R-O)_mPO-hal_x$$

where R is a member selected from the group consisting of aliphatic and aromatic hydrocarbon radicals, hal is halogen selected from the group consisting of chlorine, bromine and iodine, $x$ is an integer from 1 to 2, $n$ is zero or 1, and $m$ is 1 when $x$ is 2 and $m$ is 2 when $x$ is 1.

6. A photosensitive composition in accordance with claim 1, in which said chemical compound is orthonitrobenzaldehyde.

7. Photosensitive sheet material comprising sheet stock carrying on a surface thereof, a leucocyanide of a triphenylmethane dye, an activator which renders said composition sensitive to electromagnetic radiation less than 4000 angstrom units, and a chemical compound which is ineffective to bring about coloration of the triphenylmethane dye but which, under the influence of said electromagnetic radiation, is converted to a different chemical compound having a greater acidity and sufficient to enhance the development of coloration of said triphenylmethane dye.

8. Photosensitive sheet material comprising sheet stock carrying a transparent organic film coating containing a leucocyanide of a triphenylmethane dye, an activator which renders said leucocyanide sensitive to electromagnetic radiation less than 4000 angstrom units, and a chemical compound which is ineffective to bring about coloration of the triphenylmethane dye but which, under the influence of said electromagnetic radiation, is converted to a different chemical compound having a greater acidity and sufficient to enhance the development of coloration of said triphenylmethane dye.

9. Photosensitive sheet material comprising sheet stock carrying a cellulose acetate butyrate coating containing a leucocyanide of a triphenylmethane dye, an activator which renders said leucocyanide sensitive to ultraviolet light, and a chemical compound which is ineffective to bring about coloration of the triphenylmethane dye but which, under the influence of said ultraviolet light, is converted to a different chemical compound having a greater acidity and sufficient to enhance the development of coloration of said triphenylmethane dye.

10. Photosensitive sheet material in accordance with claim 7, wherein said chemical compound is a halogen-containing compound corresponding to the formula $$(hal_n-R-O)_mPO-hal_x$$

where R is a member selected from the group consisting of aliphatic and aromatic hydrocarbon radicals, hal is halogen selected from the group consisting of chlorine, bromine and iodine, $x$ is an integer from 1 to 2, $n$ is zero or 1, and $m$ is 1 when $x$ is 2 and $m$ is 2 when $x$ is 1.

11. Photosensitive sheet material in accordance with claim 7, wherein said chemical compound is orthonitrobenzaldehyde.

12. A photosensitive composition, sensitive to electromagnetic radiation lower than 4000 angstrom units, comprising a leucocyanide of a triphenylmethane dye, an activator therefor, and a chemical compound corresponding to the formula

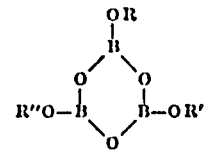

where R, R' and R" are alkyl radicals.

13. Photosensitive sheet material comprising sheet stock carrying on a surface thereof a leucocyamide of a triphenylmethane dye, an activator which renders said composition sensitive to electromagnetic radiation less than 4000 angstrom units, and a chemical compound corresponding to the formula

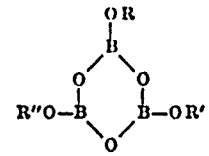

where R, R' and R" are alkyl radicals.

References Cited in the file of this patent

UNITED STATES PATENTS

| | | |
|---|---|---|
| 2,304,890 | Dickey et al. | Dec. 15, 1942 |
| 2,304,946 | McNally et al. | Dec. 15, 1942 |
| 2,325,038 | Chalkey | July 27, 1943 |
| 2,676,887 | Chalkley | Apr. 27, 1954 |
| 2,787,329 | Schechter | Apr. 2, 1957 |
| 2,844,465 | Chalkey | July 22, 1958 |
| 2,855,300 | Chalkey | Oct. 7, 1958 |
| 2,921,407 | Wagner et al. | Jan. 19, 1960 |

OTHER REFERENCES

Conant et al.: The Chemistry of Organic Compounds, 4th edition, Macmillan Co., N.Y., 1952, page 519.

L. G. Fagerlind: "Molar Refractions and Parachlors of Some Organic Phosphoryl Compounds," reported in Chem. Ab., vol. 49, p. 22e.

Yakubovich: "Synthesis of Compounds of Group V Elements—Organophosphorous Compounds," reported in Chem. Ab., vol. 47, pp. 9254g–9256b.